Feb. 16, 1971    D. B. ANDERSON ET AL    3,563,630
RECTANGULAR DIELECTRIC OPTICAL WAVEGUIDE OF WIDTH ABOUT
ONE-HALF WAVELENGTH OF THE TRANSMITTED LIGHT
Filed Dec. 7, 1966    4 Sheets-Sheet 1

INVENTORS
DEAN B. ANDERSON
RUDOLF R. AUGUST
BY WILLIAM A. McDOWELL
SIEGFRIED G. PLONSKI

Howard A. Silber
ATTORNEY

INVENTORS
DEAN B. ANDERSON
RUDOLF R. AUGUST
BY WILLIAM A. McDOWELL
SIEGFRIED G. PLONSKI

Howard A Silber

ATTORNEY

United States Patent Office 3,563,630
Patented Feb. 16, 1971

1

3,563,630
RECTANGULAR DIELECTRIC OPTICAL WAVE-
GUIDE OF WIDTH ABOUT ONE-HALF WAVE-
LENGTH OF THE TRANSMITTED LIGHT
Dean B. Anderson, Whittier, Rudolf R. August, Laguna
Beach, William A. McDowell, Orange, and Siegfried G.
Plonski, Santa Ana, Calif., assignors to North American Rockwell Corporation, a corporation of Delaware
Filed Dec. 7, 1966, Ser. No. 599,833
Int. Cl. G02b 5/14
U.S. Cl. 350—96                                     13 Claims

ABSTRACT OF THE DISCLOSURE

A dielectric waveguide consisting of a ribbon of dielectric material of transverse dimensions near the wavelength of the infrared, ultraviolet or visible light to be transmitted and which is mounted on a dielectric layer carried by a substrate. Said ribbon having an index of refraction greater than that of the dielectric layer and further being cladded with a metal layer.

This invention relates to an optical waveguide and more particularly to a dielectric waveguide capable of propagating infrared, visible, or ultraviolet light, and having cross-sectional dimensions comparable to the wavelength of the guided light.

Presently used optical waveguides include sequences of lenses or mirrors, and cladded or uncladded glass fibers. The application of mirrors or lenses to systems of extremely small physical size is impractical if not impossible. Uncladded glass fibers having diameters less than one wavelength propagate light as a single mode cylindrical surface wave with most energy outside of the fiber. While such uncladded glass fibers can be manufactured there is no practical means of supporting them without interfering with surface waves carried on the fiber. Use of a fiber having a diameter equal to many wavelengths results in multimode propagation; that is, should a single mode be excited within the fiber, slight surface irregularities rapidly will give rise to other modes which are coupled to each other in random fashion. This phenomenon results in signal distortion. While cladded glass fibers allow a single mode cylindrical wave to be propagated in the cladding (assuming the cladding is in the order of many microns thick) such cladded fibers are difficult to incorporate into optical microcircuits.

The dielectric waveguides which form the subject matter of the present invention comprise a strip or ribbon of dielectric material having cross-sectional dimensions in the order of the wavelength of the light to be guided. The strip or ribbon is disposed on a layer of material having an index of refraction different from that of the ribbon. In a typical embodiment, the cross-section of such a waveguide may be rectangular and have, for example, a thickness of 0.3 micron and a width of 2 microns.

Thus it is an object of this invention to provide a dielectric waveguide for transmitting infrared, visible, or ultraviolet light.

It is another object of this invention to provide a dielectric waveguide which may be supported on a substrate.

Yet another object of this invention is to provide an optical waveguide capable of supporting a single mode of propagation.

It is yet another object of this invention to provide an optical waveguide capable of propagating light in only those modes originally inserted into the guide, and which will not introduce spurious higher order coupled modes.

2

A further object of this invention is to provide a waveguide having cross-sectional dimensions in the order of optical wavelengths.

A still further object of this invention is to provide a structure in which a waveguide may be included in an optical circuit on a single substrate.

Further objects and features of the invention will become apparent in the following description and drawings which are utilized for illustrative purposes only.

FIG. 3a illustrates the case wherein the waveguide is isolated from a substrate, and FIG. 3b illustrates the situation in which the waveguide is disposed on a dielectric substrate.

Figure 1:
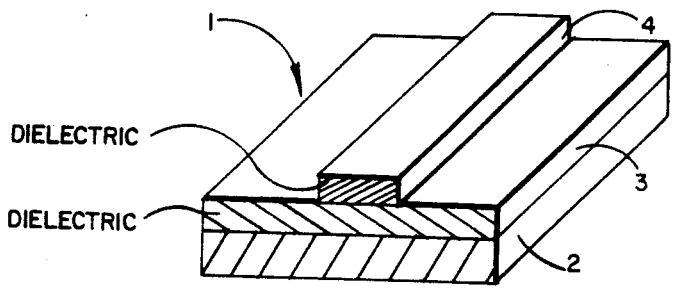
FIG. 1 shows a greatly enlarged perspective view, in partial section and in partial elevation, of one embodiment of the inventive dielectric optical waveguide.

Referring now to FIG. 1 there is shown a typical embodiment of the inventive dielectric optical waveguide 1. The waveguide is mounted on a substrate 2 which may comprise, e.g., a semiconductor material such as silicon, a metal, or a dielectric. Disposed on substrate 2 is a dielectric layer 3 having index of refraction $n_1$. A strip or ribbon 4 of dielectric material having index of refraction $n_2$ is disposed on top of the dielectric layer 3. The index of refraction $n_2$ should be greater than $n_1$ at the wavelength of light being guided.

In a preferred embodiment, the width of dielectric ribbon 4 may be approximately one-half guide wavelength of the light transmitted by waveguide 1. The term guide wavelength refers to the wavelength of light as propagated within the dielectric medium. The thickness of dielectric ribbon 4 should be no greater than its width, and preferably should be considerably thinner than its width. Since the width represents the maximum cross-sectional dimension of dielectric ribbon 4, it is this dimension which determines in large part the lowest order mode which may be propagated by the dielectric waveguide.

Figure 2:
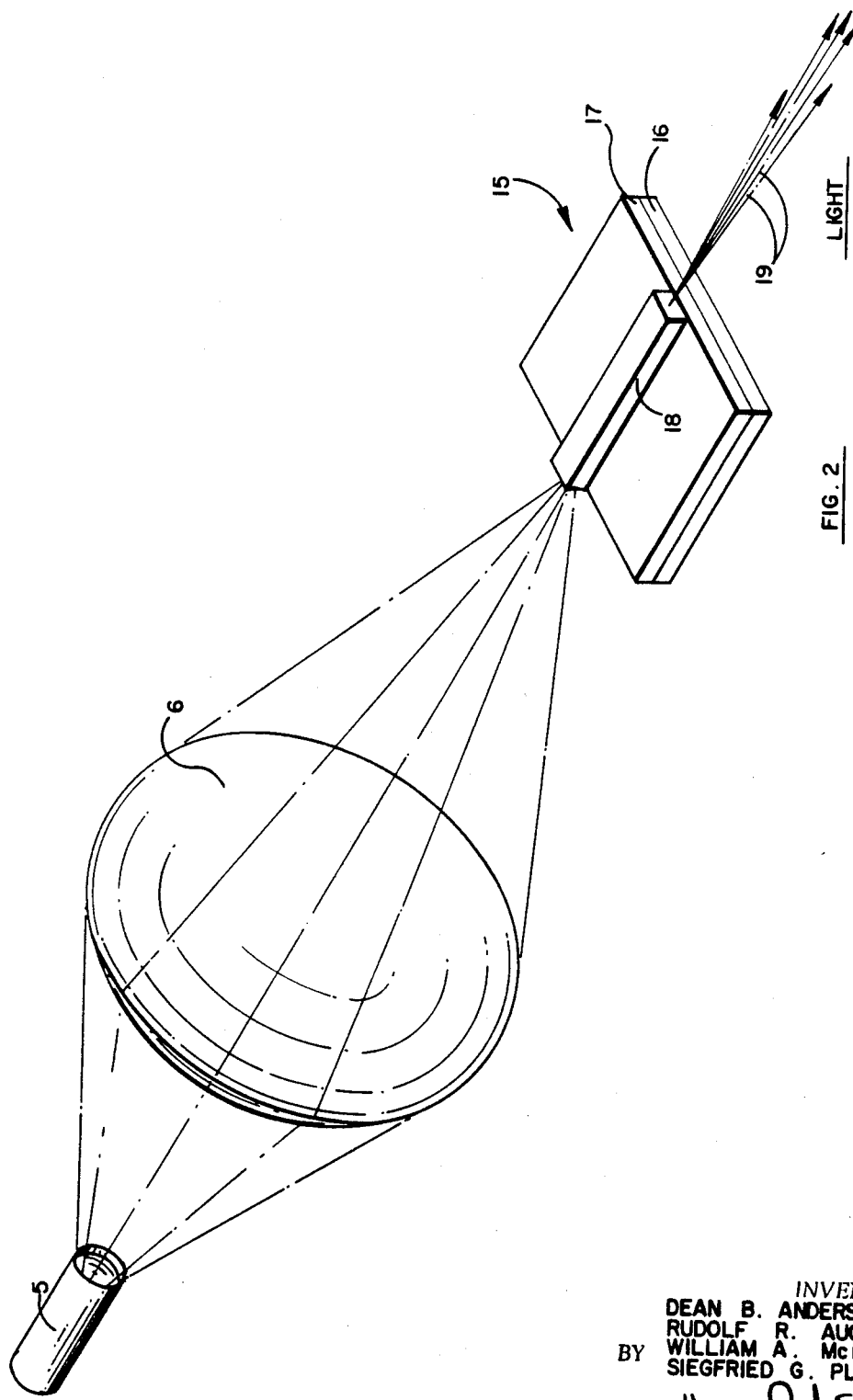
FIG. 2 is a perspective view illustrating a typical manner in which the dielectric optical waveguide may be employed to transmit light.

As illustrated in FIG. 2, when light from an external source 5 is introduced into one end of ribbon 18, the incident light will be propagated down the dielectric waveguide 15 and will emerge from the opposite end. Note that while FIG. 2 includes waveguide 15 which resembles the embodiment of FIG. 1 (including substrate 16 and dielectric layer 17), any of the embodiments of the inventive dielectric waveguide may be employed in a light transmission system such as that of FIG. 2.

As shown in the typical setup of FIG. 2, coherent or non-coherent, light from source 5 may be focused onto one end of ribbon 18 using, e.g., a lens 6. Alternately, the light source may be located immediately adjacent one end of waveguide 15, in which case no focusing element may be required. In either instance, the light 19 will emerge from the opposite end of waveguide 1. A light utilization device (not shown) may be situated immediately adjacent the end of ribbon 18, or light 19 may be directed to it, e.g., by another lens.

Unlike electromagnetic propagation within a hollow, metal walled waveguide, light propagated by dielectric waveguide 1 (see FIG. 1) will not be constrained entirely to within the dielectric ribbon 4. This reflects the fact that unlike a metal walled waveguide, there may exist continuous normal as well as transverse components of the electric and magnetic fields at the boundaries of the dielectric. This phenomena typically is illustrated by FIG. 3.

Figure 3A:
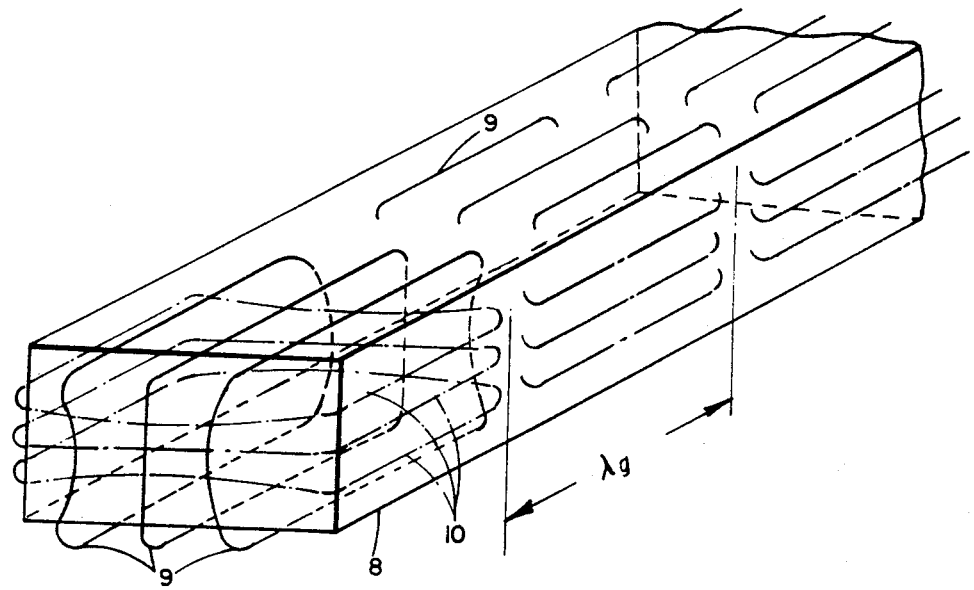
FIGS. 3a and 3b show diagrammatically the electric and magnetic field lines present in a typical dielectric waveguide for the lowest order hybrid electric mode.

Referring now to FIG. 3a, there is shown schematically the electric and magnetic field distributions in a rectangular dielectric waveguide propagating a lowest order hybrid mode. As illustrated therein, dielectric ribbon 8 is completely suspended in a dielectric medium having an index of refraction lower than that of the ribbon and the electric field components 9 and magnetic field components 10 each take the form of continuous lines. While FIG. 3a shows the electric field lines 9 in the vertical plane and magnetic field lines 10 in the horizontal plane, in some instances these may be interchanged. Note that both the electric and magnetic field components extend in part beyond the surfaces of dielectric ribbon 8. The dimension $\lambda_g$ indicated in FIG. 3a represents the guide wavelength of the light being propagated.

Figure 3B:
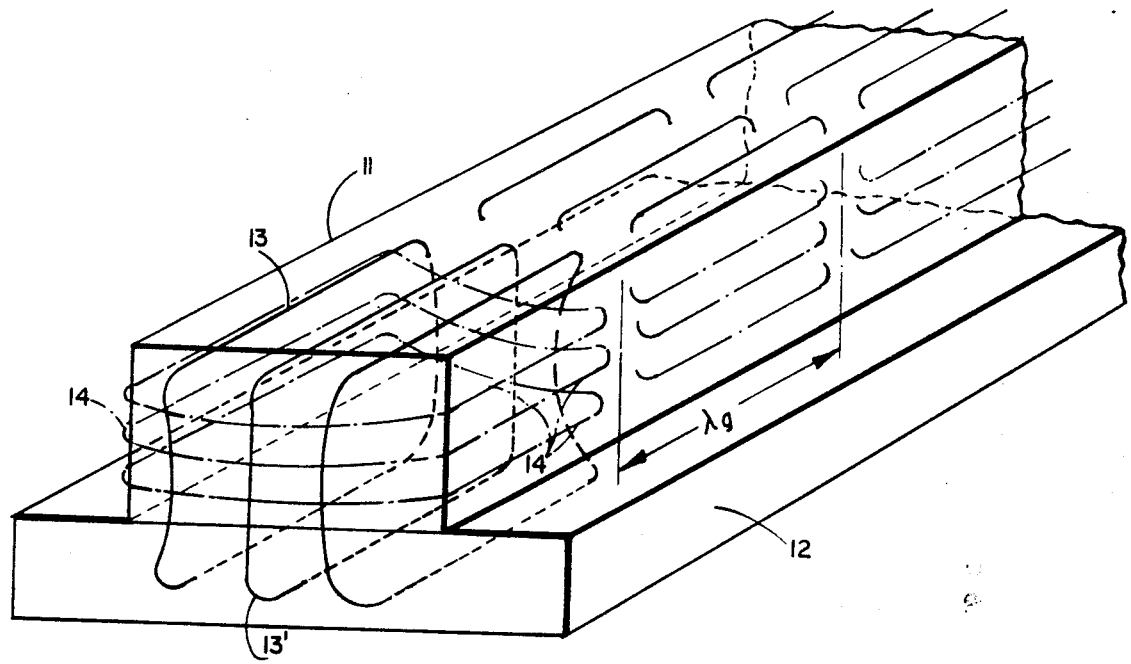

FIG. 3b illustrates the perturbing effect on hybrid mode propagation when a dielectric ribbon 11 is supported on a dielectric layer 12 having a lower index of refraction than that of ribbon 11. Dielectric ribbon 11 and layer 12 may correspond respectively to ribbon 4 and dielectric layer 3 of the typical optical waveguide embodiment shown in FIG. 1. Comparison of FIGS. 3a and 3b indicates, e.g., that the electric field components 13' extend further beyond ribbon 11 (into dielectric layer 12) than do the electric field 9 components extending into free space from suspended dielectric ribbon 8 (FIG. 3a). This phenomenon occurs because dielectric layer 12 has an index of refraction higher than that of free space (but less than the index of refraction of ribbon 11). The reduced difference in indices of refraction at the interface of ribbon 11 and layer 12 (as compared with the difference in indices between ribbon 8 and free space) results in a reduced ability of the dielectric ribbon to bind the fields. As further shown in FIG. 3b, the magnetic field components 14, which extend in planes generally parallel to dielectric layer 12 also are perturbed slightly at the lower regions of ribbon 11; in particular, a field curvature results as the ability of ribbon 8 to contain the field becomes weaker. Should the dielectric waveguide shown in FIG. 3b be disposed on a metallic substrate (not shown) further perturbation of the electric and magnetic fields guided by ribbon 11 would be experienced. In particular, the interface between dielectric layer 12 and the underlying metallic layer would act as a boundary below which electric field components could not extend.

It is to be understood that the field configurations shown in FIGS. 3a and 3b are typical and indicate only one possible mode of propagation through the dielectric waveguide. Other higher order modes, including some having only one longitudinal field component, also may be propagated by the inventive dielectric optical waveguide.

A further characteristic of the inventive dielectric optical waveguide is the absence of spuriously introduced, coupled higher order modes. Thus if light introduced into a dielectric waveguide gives rise to a single mode (such as the hybrid mode illustrated in FIG. 3), this mode alone will be propagated down the waveguide. It has been found that even slight irregularities in the edges of the dielectric ribbon (such as ribbon 4 of FIG. 1) do not result in the occurrence of unwanted coupled higher order modes. Thus the inventive dielectric waveguide may be employed in applications such as optical information processing systems, where minimum spatial signal distortion is required.

Figure 4:
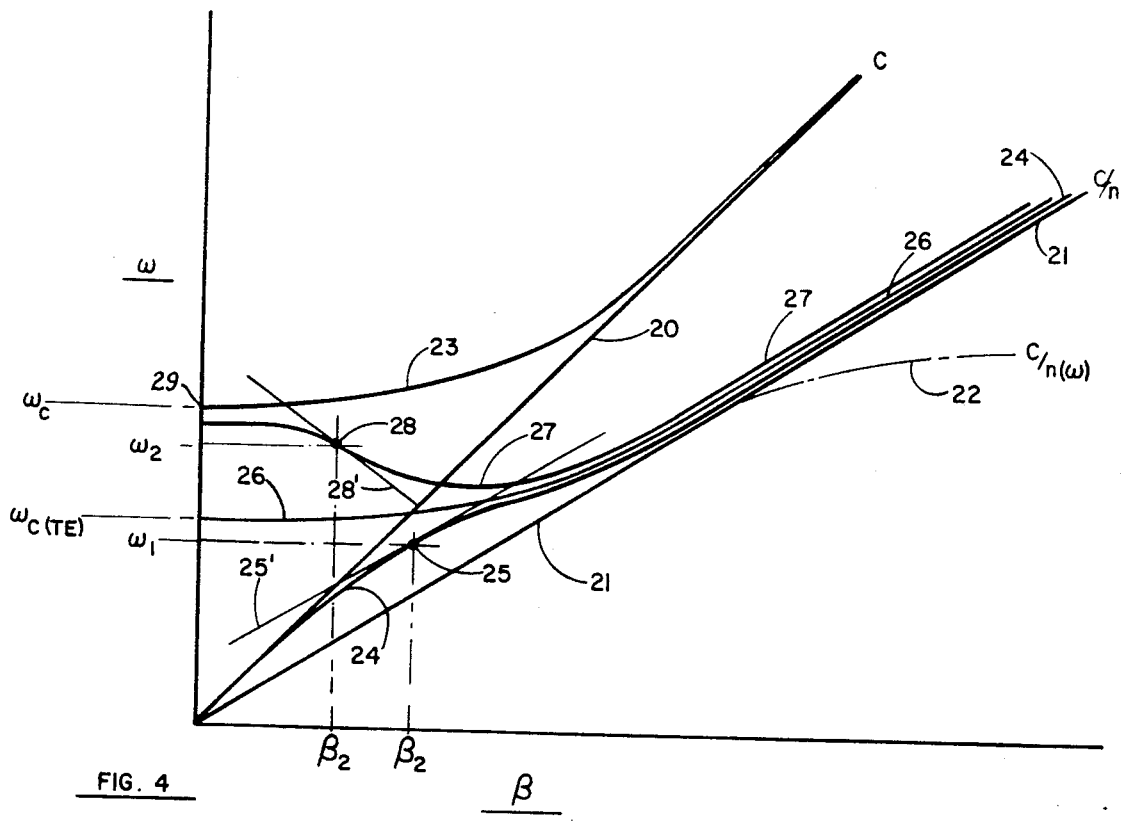
FIG. 4 shows a Brillouin diagram relating the phase velocity and group velocity of light propagated by a dielectric waveguide to the frequency of the light.

Typical dispersion characteristics of a dielectric optical waveguide are illustrated in the Brillouin ($\omega-\beta$) diagram of FIG. 4. In the graph of FIG. 4, the frequency $\omega$ of the light propagated by the waveguide is plotted along the ordinate and the propagation constant $\beta$ (in radians phase shift per unit length), is plotted along the abscissa. The propagation constant is defined by $$\beta = n(\omega)\frac{\omega}{c} \qquad (1)$$

where $n(\omega)$ is the index of refraction of the dielectric medium, $\omega$ is the frequency of the propagated light, and $c$ is the velocity of light. Note that the index of refraction of a material itself may be a function of frequency.

The $\omega-\beta$ diagram conveniently displays both the phase velocity and group velocity of light being propagated in a waveguide as a function of frequency. This is evident if it is recalled that the phase velocity $v_p$ is given by:

$$v_p = \frac{\omega}{\beta} \qquad (2)$$

while the group velocity $v_g$ is given by:

$$v_g = \frac{\partial \omega}{\partial \beta} \qquad (3)$$

As shown in FIG. 4, the two radial lines designated 20 and 21 indicate respectively the velocity of a plane wave in free space and in a nondispersive dielectric having index of refraction $n$. Curve 23 is typical of the dispersion of the lowest order mode propagated in a conventional air filled, metal walled rectangular waveguide; the intersection 29 with the ordinate ($\omega_c$) represents the cutoff frequency of the waveguide.

The Brillouin ($\omega-\beta$) diagram of FIG. 4 may be understood by noting that the index of refraction of a dielectric material typically is not constant but rather is a function of frequency. As illustrated generally by line segment 22, a deviation of a curve from a radial is indicative of dispersion in the dielectric material. The slope of an $\omega-\beta$ curve at a particular point represents the group velocity in a waveguide of a signal having frequency $\omega$. For example, curve 24 (FIG. 4) is typical of the dispersion of a dielectric waveguide such as that illustrated in FIG. 1. For such a waveguide, the group velocity exhibited by light of frequency $\omega_1$ would be given by the slope 25' (or by $\partial\omega/\alpha\beta$) of curve 24 at point 25. The phase velocity at this frequency would be given by value $\omega_1/\beta_1$. Note that since the slope 25' of curve 24 at point 25 (i.e. the phase velocity) is positive and the group velocity also is positive, light of frequency $\omega_1$ will be propagated as a forward wave in the waveguide of FIG. 1.

The dielectric waveguide 1 illustrated in FIG. 1 may be constructed, for example, by employing well known vapor deposition and photolithographic techniques. For example, one may begin with a substrate 2 (see FIG. 1) of a semiconductor material such as silicon. Dielectric layer 3 may comprise, e.g., a dielectric compound of the substrate semiconductor material. As an example, a dielectric layer 3 of silicon dioxide may be produced on a silicon substrate 2 by placing the substrate in an evacuated chamber and subjecting it to a water vapor or oxygen atmosphere.

Possible dielectric materials which may be used for dielectric ribbon 4 include, but are not limited to, $Al_2O_3$, $CaF_2$, $CeO_3$, $LaF_3$, $La_2O_3$, $MgF_2$, MgO, $Si_3N_4$, $YF_3$ and $Y_2O_3$. As indicated in Table 1 below, most of these dielectrics have an index of refraction greater than that of silicon dioxide, which $SiO_2$ has an index of refraction of 1.4 in the special region between 1 micron and 2 microns.

TABLE I

| Material: | Index of refraction (between 1 micron and 2 microns) |
|---|---|
| $Al_2O_3$ | 1.8 |
| $CaF_2$ | 1.4 |
| $CeO_3$ | 2.2 |
| $LaF_3$ | 1.6 |
| $La_2O_3$ | 1.8 |
| $MgF_2$ | 1.4 |
| MgO | 1.7 |
| $Si_3N_4$ | 2.1 |
| $YF_3$ | 1.6 |
| $Y_2O_3$ | 1.8 |

To produce ribbon 4, the combination of substrate 2 and dielectric layer 3 may be placed in an evacuated chamber, wherein a layer of the desired ribbon dielectric material may be deposited using evaporation, sputtering or other techniques well known to those skilled in the art. The thickness of this deposited dielectric layer typically may be in the order of .2 to .3 micron, and should correspond to the desired thickness of ribbon 4. Portions of this deposited dielectric layer then may be etched away selectively to form ribbon 4. Because most etchants which attack the dielectric materials listed in Table I also will attack standard photoresists, it may be desirable to employ a masking technique of the sort described below.

Should $Al_2O_3$ be selected as the material for ribbon 4, a layer of this dielectric first is prepared, as described previously, on the combination of silicon substrate 2 and $SiO_2$ dielectric layer 3. While hot phosphoric acid may be used selectively to etch away the $Al_2O_3$ without etching the underlying $SiO_2$, the phosphoric acid will attack standard photoresist materials such as Kodak KPR or Shipley AZ. To circumvent this problem, a layer of metal, for example gold, is deposited by sputtering or other techniques on top of the $Al_2O_3$ layer. Next, a photoresist such as KPR or AZ is coated over the metal layer.

Once the photoresist has been exposed to an image of the desired ribbon 4 configuration, the photoresist is polymerized, and the areas of the metal layer which are not still covered with photoresist are removed using an iodine etch solution well known to those skilled in the art. Such an iodine solution will attack the gold, but will not attack the underlying $Al_2O_3$ layer. The photoresist then is removed using standard stripping agents. At this point the structure comprises, in order, unetched layers respectively of silicon (substrate 2), $SiO_2$ (layer 3), and $Al_2O_3$, and a ribbon of gold which has been so etched as to resemble the desired configuration of ribbon 4.

With the etched gold ribbon serving as a mask, hot phosphoric acid maintained at a temperature between 60° C. and 85° C., may be used to etch away selectively the $Al_2O_3$ to form ribbon 4; the phosphoric acid will not attack the $SiO_2$. Finally, the ribbon of gold may be removed using an iodine etch solution. The resultant structure has the appearance of the waveguide shown in FIG. 1.

The photoresist used in the above described process may be exposed from a microphotographic reduction of a drawing of the desired waveguide ribbon pattern. While the dielectric ribbons are illustrated in the various figures (e.g., ribbon 1 in FIG. 1) as straight sections, the invention is not limited to such configurations, and other patterns such as curves, bends, and the like may be used.

Since the width of the desired ribbon 4 may be approximately one-half guide wavelength of the light to be guided, and thus may be in the range of a very few microns, very fine line definition is required when exposing the photoresist. To achieve this requires use of a lens having large numerical aperture and a minimum of aberrations. Note however that use of enlarged numerical aperture objectives causes a critical focusing problem since the depth of focus may be smaller than the photoresist emulsion thickness. Another problem which may be encountered in producing ribbons with dimensions comparable to the wavelength of the light used to expose the photoresist is that diffraction phenomena may occur during the exposure step. This may be anticipated and compensated for in the original art work from which is produced the photomicrograph used to expose the KPR. Appropriate compensation techniques include, for example, the use of serifs at locations where sharp angle bends are desired in the waveguide.

It should be noted that the optical properties of materials vary considerably as a function of wavelength. This has already been noted with respect to dielectrics in conjunction with the $\omega - \beta$ diagram (FIG. 4) discussed above. Optical properties of metals also vary and, for example, some metals may act as dielectrics at ultraviolet wavelengths. Thus, where the waveguide embodiment of FIG. 1 is described in terms of a dielectric layer, this implies the use of a material which, at the wavelength propagated, behaves as a dielectric.

Figure 5:
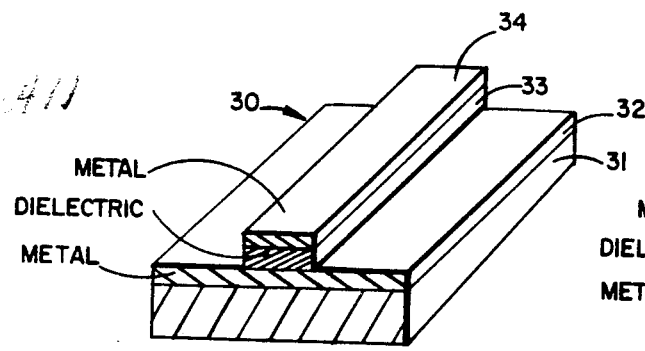
FIG. 5 shows a perspective view, in partial section and in partial elevation, of a second embodiment of the inventive dielectric waveguide.

Referring now to FIG. 5 there is shown a metal-dielectric-metal waveguide, a second embodiment of the subject invention. Waveguide 30 comprises a substrate 31, a first metal layer 32, a ribbon of dielectric material 33, and stop ribbon 33 a second ribbon or coating of metal 34. Typical cross-sectional dimensions of dielectric layer 33 may include a thickness of 0.5 micron and a width of 3 microns.

The embodiment of the dielectric waveguide shown in FIG. 5 exhibits characteristics somewhat different from that of the embodiment illustrated in FIG. 1. For example, a TEM mode may be excited in waveguide 30 when the electric field between the metal strips is oriented normal to the strip. Losses in waveguide 30 when propagating the TEM mode increase with frequency due to the effects of induced longitudinal current in the conductors. A TE mode may be excited in waveguide 30 when the electric field between the metal strips is oriented parallel to the strips. As illustrated typically by curve 26 in FIG. 4, the TE mode is highly dispersive near cutoff ($\omega_{c(TE)}$ as indicated in FIG. 4), which occurs when the spacing between metal layer 32 and metal ribbon 34 is one-half of the wavelength of light in the dielectric. Unlike a hollow rectangular metal waveguide, the losses of this TE mode decrease ad infinitum as the wavelength decreases.

A metal-dielectric-metal waveguide 30 as such as that shown in FIG. 5, may utilize, for example, a substrate 31 of quartz or silicon, a metal layer 32 of gold, a dielectric ribbon 33 comprising one of the dielectrics (e.g., $Al_2O_3$) listed in Table I, and a metal ribbon 34 of gold. Waveguide 30 may be produced by a series of process steps similar to those described in conjunction with the waveguide embodiment of FIG. 1; the process differences include deposition of a layer of gold (by sputtering or other technique) rather than $SiO_2$ on top of the substrate, and elimination of the final iodine etch step wherein the top gold ribbon was removed.

Figure 6:
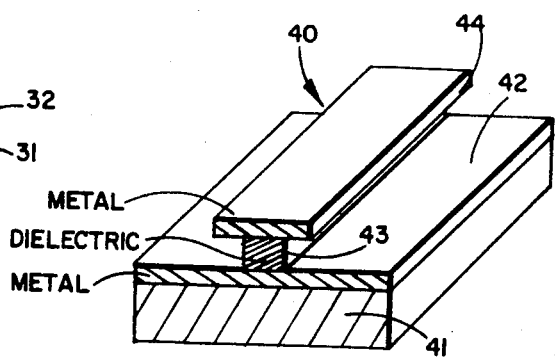
FIG. 6 shows a perspective view, in partial section and in partial elevation, of an embodiment of the dielectric waveguide capable of backward wave propagation.

FIG. 6 shows another embodiment of the inventive dielectric waveguide. In this configuration, waveguide 40 comprises a substrate 41, a first metal layer 42, a dielectric ribbon 43, and a metal ribbon 44 which has a width greater than that of dielectric ribbon 43. In a preferred embodiment, metal ribbon 44 may have a width of approximately one-half guide wavelength; the width of dielectric ribbon 43 then may be in the order of one-half of the width of metal ribbon 44.

The waveguide structure illustrated in FIG. 6 has the unusual property that it can propagate a backward wave; that is, waveguide 40 exhibits dispersion characteristics indicated generally by typical curve 27 of FIG. 4. It may be seen by referring to the $\omega-\beta$ diagram of FIG. 4 that in certain portions of curve 27, for example, near point 28, the slope 28' of curve 27 is negative. Since the group velocity of light propagated by a waveguide is given by the slope of the $\omega-\beta$ curve, it is apparent that the group velocity at frequency $\omega_2$ is negative. Moreover, the phase velocity at frequency $\omega_2$ is given by $\omega_2/\beta_2$, and hence is positive. Such simultaneous occurrence of phase velocity and group velocity of opposite sense characterizes backward wave propagation.

Figure 7:
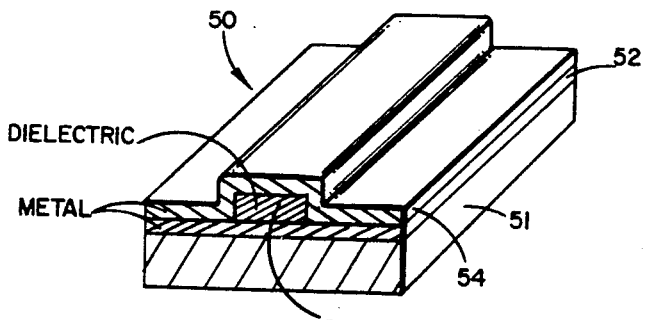
FIG. 7 shows a perspective view, in partial section and in partial elevation, of a metal covered dielectric waveguide.

FIG. 7 shows yet another embodiment of the inventive dielectric waveguide. In this embodiment, waveguide 50 comprises a substrate 51, a first metal layer 52, a dielectric ribbon 53 and a layer of metal 54 which layer covers both the top and the sides of dielectric ribbon 53. Waveguide 50 thus comprises a metal walled waveguide completely filled with dielectric material.

A dielectric waveguide such as that shown in FIG. 7 exhibits extremely high losses when the dimensions of the waveguide are comparable to one guide wavelength. Increasing the dimensions by a factor of 10 reduces the losses significantly, but permits additional modes to propagate. The use of this type of waveguide in the optical region is limited to short sections and complicated patterns such as hybrid junctions or abrupt corners where other structures do not adequately bind the field. For such short sections, high losses can be tolerated and the metal coated dielectric waveguide acts very effectively to confine and bend the field around abrupt corners.

Figure 8:
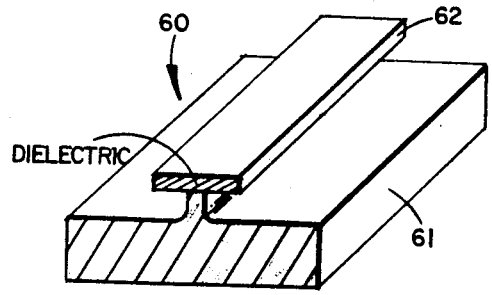
FIG. 8 shows a perspective view, in partial section and in partial elevation, of an embodiment of the dielectric waveguide having a generally T-shaped cross-section.

FIG. 8 shows yet another embodiment of the dielectric waveguide, which may be referred to as a T-guide. As illustrated in FIG. 8, waveguide 60 comprises a substrate 61 which may be or may not be dielectric, and a dielectric ribbon 62 having an index of refraction greater than that of substrate 61. The cross-sectional dimensions of ribbon 62 may be approximately the same as those of ribbon 4 in the configuration of FIG. 1, that is, the preferred width of ribbon 62 is approximately one-half guide wavelength, while its thickness preferably should be no greater than its width. If the neck of the T-guide is sufficiently narrow, it is also possible to utilize a ribbon 62 having an index of refraction smaller than that of substrate 61. Waveguide 60 generally exhibits lower losses than a waveguide of the embodiment illustrated in FIG. 1.

A waveguide 60 such as illustrated in FIG. 8 may be constructed by starting with a structure not unlike that of FIG. 1 comprising a dielectric ribbon disposed directly on a flat-surfaced substrate. Then, by using an etchant which will selectively attack the material of substrate 61 while not etching ribbon 62, sufficient substrate material may be removed to form the structure illustrated in FIG. 8. For example, should substrate 61 comprise silicon and ribbon 62 comprise $Al_2O_3$, a mixture (by volume) of 1 part HF, 10 parts $HNO_3$, and 2 parts $H_2O$ may be used as the etchant to selectively etch away the silicon substrate.

Figure 10:
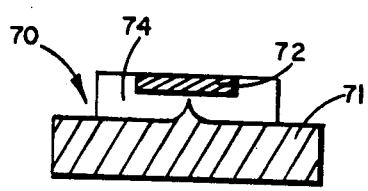
FIG. 10 is a sectional view taken at line 10—10 of FIG. 9.
Figure 9:
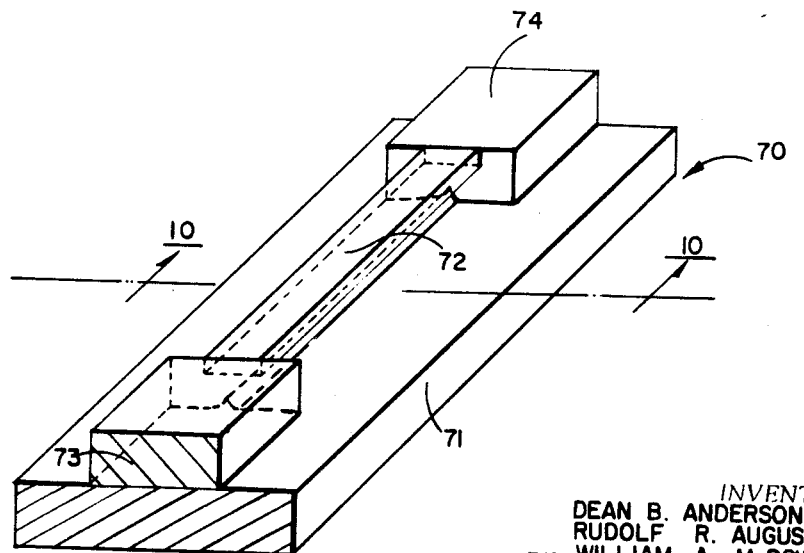
FIG. 9 shows a perspective view of yet another embodiment of the invention wherein a dielectric waveguide is suspended between two support members on a common substrate; the support members may comprise, respectively, a light source and a photosensitive device.

By allowing the selective etachant process described in conjunction with the embodiment of FIG. 8 to proceed even further, a completely suspended dielectric waveguide supported between two end-members, may be produced. As illustrated in embodiment 70 of FIG. 9, such a suspended ribbon waveguide is potentially useful as an interconnection between means on a single substrate. FIG. 10, a cross-section along the line 10—10 of FIG. 9 illustrates that suspended dielectric ribbon 72 is, in fact, completely isolated (at this point) from the underlying substrate 71.

Referring again to FIG. 9, the support members 73 and 74 between which ribbon 72 is suspended may themselves be components of an optical circuit. For example, support member 73 may comprise a source of light such as a gallium arsenide diode. Alternately, support members 73 may comprise a dielectric optical waveguide, via which light may be introduced into one end of suspended ribbon 72 using an external source 5 of illumination and a lens 6, as illustrated in FIG. 2. The other support member 74 may comprise a photosensitive device. Such an element could be produced, for example, by making member 74 of silicon and forming therein a vertical p-n photosensitive junction. Clearly, many of such devices may be combined on a single substrate to produce, for example, optical circuits of some considerable complexity.

Although the invention has been described and illustrated in detail, it is to be clearly understood that the same is by way of illustration and example only and is not to be taken by way of limitation, the spirit and scope of the invention being limited only by the terms of the appended claims.

We claim:

1. A rectangular waveguide for use in the visible, infrared, or ultraviolet spectral regions comprising:
   a substrate,
   a single layer of material disposed on said substrate, and
   a ribbon of dielectric material disposed on said single layer, said ribbon having a width approximately one-half guide wavelength of the light to be guided and a thickness no greater than its width and wherein the index of refraction of said layer is less than that of said ribbon.

2. A waveguide as defined by claim 1 wherein said dielectric material comprises one of $Al_2O_3$, $CaF_2$, $Ce_2O_3$, $LaF_3$, $La_2O_3$, $MgF_2$, $MgO$, $SiO$, $SiO_2$, $Si_3N_4$, $YF_3$, and $Y_2O_3$.

3. A waveguide as defined by claim 1 wherein said layer of material comprises a dielectric.

4. A rectangular optical waveguide comprising:
   a single semiconductor substrate;
   a single layer of first dielectric material having an index of refraction $n_1$ disposed on said substrate; and
   a single ribbon of second dielectirc material having an index of refraction $n_2$ disposed on said layer, said ribbon having a width approximately one-half guide wavelength of the light to be guided and a thickness no greater than its width and wherein $n_1$ is less than $n_2$.

5. An optical waveguide as defined by claim 4 wherein said first dielectric material comprises a compound of said semiconductor and wherein said second dielectric material is selected from the class consisting of $Al_2O_3$, $CaF_2$, $Ce_2O_3$, $LaF_3$, $La_2O_3$, $MgF_2$, $MgO$, $SiO$, $SiO_2$, $Si_3N_4$, $YF_3$ and $Y_2O_3$.

6. An optical waveguide as defined by claim 4 wherein said first dielectric material is air, and further comprising support means for supporting said ribbon of second dielectric material with respect to said semiconductor substrate.

7. A rectangular optical waveguide comprising:
   a layer of metal;
   a dielectric ribbon disposed on said layer; and
   a ribbon of metal disposed on said dielectric ribbon, and wherein the width of said dielectric ribbon is approximately one-half guide wavelength of the light to be guided and the thickness of said dielectric ribbon is no greater than its width.

8. An optical waveguide as defined by claim 7 wherein said metal layer is disposed on a substrate.

9. A rectangular optical waveguide comprising:
   a first layer of metal;
   a dielectric ribbon disposed on said first layer; and
   a second layer of metal disposed atop said ribbon, and wherein said ribbon has a width less than one-half guide wavelength and a thickness no greater than its width, and wherein said second layer has a width approximately one-half guide wavelength.

10. A waveguide for use in the visible, infrared, or ultraviolet spectral regions comprising:
   a substrate,
   a layer of metal disposed on said substrate, and
   a ribbon of dielectric material disposed on said layer, said ribbon having a width approximately one-half guide wavelength of the light to be guided and a thickness no greater than its width and wherein the indices of refraction of said layer and said ribbon have different values.

11. A waveguide for use in the visible, infrared, or ultraviolet spectral regions comprising:
   a substrate,
   a layer of metal disposed on said substrate,
   a ribbon of dielectric material disposed on said layer, said ribbon having a width approximately one-half guide wavelength of the light to be guided and a thickness no greater than its width and wherein the indices of refraction of said layer and said ribbon have different values, and
   a second layer of metal disposed atop said ribbon.

12. A waveguide for use in the visible, infrared, or ultraviolet spectral regions comprising:
   a substrate,
   a layer of dielectric material disposed on said substrate,
   a ribbon of dielectric material disposed on said layer, said ribbon having a width approximately one-half guide wavelength of the light to be guided and a thickness no greater than its width and wherein the indices of refraction of said layer and said ribbon have different values, and
   a layer of metal disposed atop said ribbon.

13. A waveguide for use in the visible, infrared, or ultraviolet spectral regions comprising:
   a substrate,
   a layer of metal disposed on said substrate, and
   a ribbon of dielectric material disposed on said layer, said ribbon having a width approximately one-half guide wavelength of the light to be guided and a thickness no greater than its width and wherein the indices of refraction of said layer and said ribbon have different values, a metal covering covering said ribbon.

References Cited
UNITED STATES PATENTS

| | | | |
|---|---|---|---|
| 2,721,312 | 10/1955 | Grieg et al. | 333—84 |
| 3,318,651 | 5/1967 | Karbowiak | 350—96 |
| 3,350,654 | 10/1967 | Snitzer | 250—227X |
| 3,386,787 | 6/1968 | Kaplan | 350—96 |

ROY LAKE, Primary Examiner

V. LAFRANCHI, Assistant Examiner

U.S. Cl. X.R.
250—227; 333—95